United States Patent [19]
Kaneno et al.

[11] Patent Number: 5,591,512
[45] Date of Patent: Jan. 7, 1997

[54] MAGNETIC RECORDING MEDIUM HAVING A MAGNETIC LAYER COMPRISING IRON POWDER AND AN UNDERLAYER COMPRISING NON MAGNETIC POWDERS HAVING SPECIFIED PARTICLE SIZE RATIOS

[75] Inventors: Kimihiko Kaneno, Nagaokakyo; Takuma Yuasa; Hideki Fujimoto, both of Otokuni-gun, all of Japan

[73] Assignee: Hitachi Maxell, Ltd., Osaka-fu, Japan

[21] Appl. No.: 590,877

[22] Filed: Jan. 24, 1996

Related U.S. Application Data

[63] Continuation of Ser. No. 186,854, Jan. 27, 1994, abandoned.

[30] Foreign Application Priority Data

Feb. 3, 1993 [JP] Japan ................................ 5-040444

[51] Int. Cl.$^6$ .................................................. G11B 5/708
[52] U.S. Cl. ........................... 428/141; 428/212; 428/323; 428/328; 428/329; 428/336; 428/402; 428/408; 428/425.9; 428/522; 428/694 BG694 BS; 428/694 BN; 428/900
[58] Field of Search ................................. 428/141, 323, 428/328, 329, 336, 402, 408, 425.9, 522, 694 BG, 694 BS, 694 BN, 900, 212

[56] References Cited

U.S. PATENT DOCUMENTS

| | | | |
|---|---|---|---|
| 4,602,359 | 7/1986 | Palmer | 369/58 |
| 4,878,114 | 10/1989 | Huynh | 358/106 |
| 4,956,220 | 9/1990 | Sueyoshi et al. | 428/141 |
| 5,084,342 | 1/1992 | Isobe et al. | 428/329 |
| 5,258,223 | 11/1993 | Inaba et al. | 428/323 |
| 5,342,668 | 8/1994 | Echigo et al. | 428/64 |
| 5,398,113 | 3/1995 | deGroot | 356/360 |

*Primary Examiner*—Stevan A. Resan
*Attorney, Agent, or Firm*—Birch, Stewart, Kolasch & Birch, LLP

[57] ABSTRACT

A magnetic recording medium comprising a non-magnetic support, an intermediate layer which is formed on the non-magnetic support containing carbon black and non-magnetic particles other than carbon black, a particle size ratio between the carbon black and non-magnetic particles being from 1.0 to 4.0 in terms of a ratio of a diameter or a short axis size of the non-magnetic particles to a particle size of carbon black, and a magnetic layer which is formed on the intermediate layer and has a thickness of 0.2 to 1.0 µm, in which magnetic layer a difference of an intensity at 102 mm$^{-1}$ and that at 205 mm$^{-1}$, in a frequency analysis of non-contact surface roughness is from 9 dB to 15 dB, in which a total thickness of the non-magnetic support, the intermediate layer and the magnetic layer is not greater than 13 µm, which recording medium is excellent in electromagnetic conversion characteristics and durability.

5 Claims, 2 Drawing Sheets

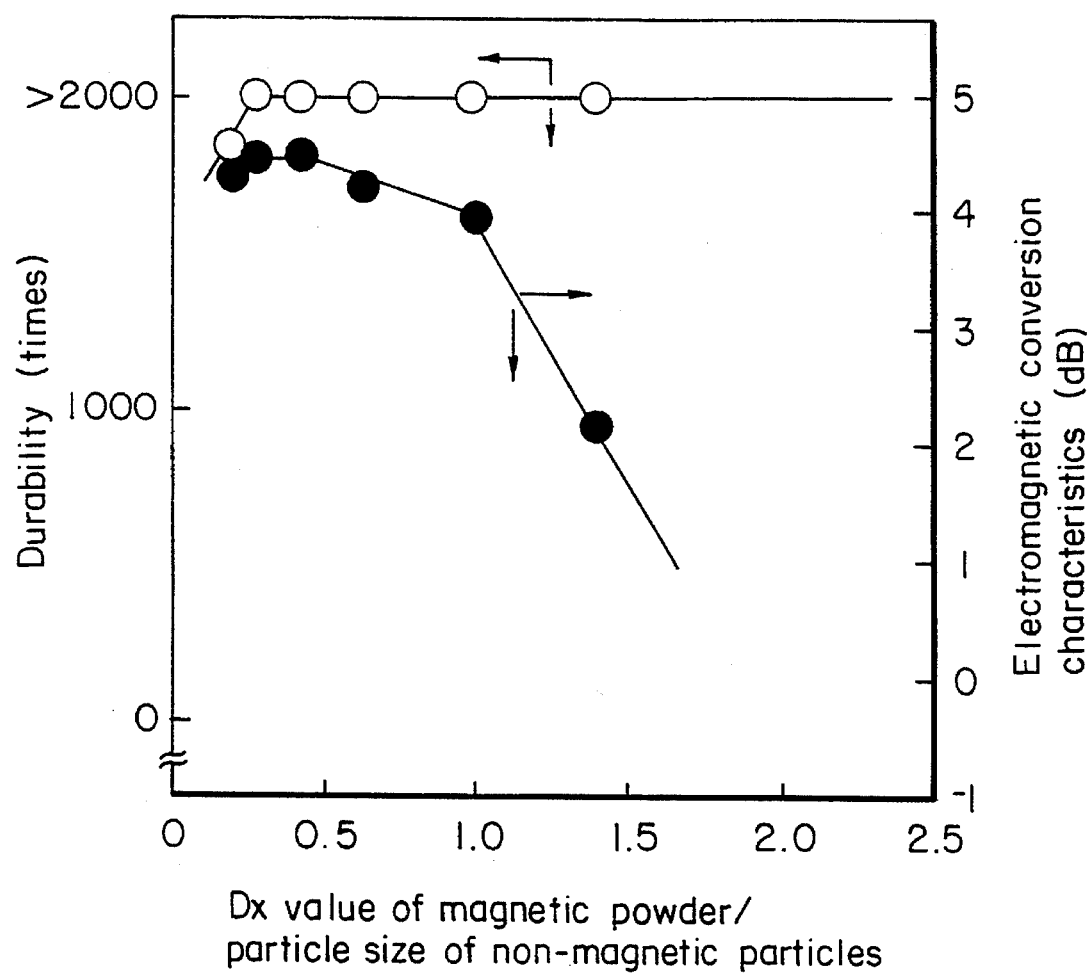

MAGNETIC RECORDING MEDIUM HAVING A MAGNETIC LAYER COMPRISING IRON POWDER AND AN UNDERLAYER COMPRISING NON MAGNETIC POWDERS HAVING SPECIFIED PARTICLE SIZE RATIOS

This application is a continuation of application Ser. No. 08/186,854 filed on Jan. 27, 1994, now abandoned.

BACKGROUND OF THE INVENTION

1. Field of the Invention

The present invention relates to a magnetic recording medium comprising a magnetic layer having a thickness of 1.0 µm or less. In particular, the present invention relates to a magnetic recording medium which has excellent electromagnetic conversion characteristics and durability, and is suitably used in an apparatus which records and reproduces digitized signals by a helical scan system.

2. Description of the Related Art

A magnetic recording medium is usually produced by coating a magnetic paint comprising magnetic powder, a binder component, an organic solvent and other necessary components on a non-magnetic support, such as a polyester film, and drying it. To satisfy the requirement for high density recording, the thickness of the magnetic layer is gradually decreased.

Recently, with the progress of signal processing and digital circuit technologies, the signals are digitized and recorded by a video recorder. Presently, since a thickness of the magnetic layer is still thick, unsaturated digital recording is employed. But, for recording and reproducing the digital signals, saturated digital recording which can be overwritten as in the case of a magnetic disc apparatus for a computer is preferred. To effect the saturated digital recording the thickness of the magnetic layer is preferably made thin.

However, when the magnetic layer is made thin to increase the recording density and improve the overwriting characteristics, surface conditions of the non-magnetic support tend to influence the properties of the magnetic layer, so that the electromagnetic conversion characteristics deteriorate, for example, the reproducing output is lowered as the thickness of the magnetic layer is decreased.

To prevent influence on the surface conditions of the non-magnetic support and to improve surface smoothness of the magnetic layer, an intermediate layer comprising a non-magnetic powder is provided between the non-magnetic support and the magnetic layer. However, while the conventional intermediate layer can prevent the influence on the surface conditions of the non-magnetic support, pin holes and/or coating streaks are formed and the durability is not improved sufficiently.

From the rheological view point of the intermediate layer when a magnetic paint is coated, it in order to increase the durability a improvement of the composition of the intermediate layer and/or coating method have been attempted. For example, it has been proposed to provide a magnetic layer having a thickness of less than 1.0 µm while the intermediate layer is still wet, whereby the electromagnetic conversion characteristics and also the durability are improved as seen in U.S. Pat. No. 5,258,223.

However, while the formation of pin holes and coating streaks on the magnetic layer surface was prevented, the surface smoothness of the magnetic layer was not improved satisfactorily, and the electromagnetic conversion characteristics may be worse than those of the magnetic recording medium in which the magnetic layer was directly formed on the non-magnetic support, in the absence of the intermediate layer.

SUMMARY OF THE INVENTION

An object of the present invention is to increase the surface smoothness of a magnetic layer having a thickness of 1.0 µm or less without forming pin holes or coating streaks sufficiently improving the electromagnetic conversion characteristics and durability of the resulting magnetic recording medium.

According to the present invention, there is provided a magnetic recording medium comprising a non-magnetic support, an intermediate layer which is formed on the non-magnetic support and which comprises carbon black and non-magnetic particles other than carbon black (hereinafter referred to as "non-magnetic particles"), a particle size ratio between the two components being from 1.0 to 4.0 in terms of a ratio of a diameter or a short axis size of the non-magnetic particles to a particle size of the carbon black, and a magnetic layer which is formed on the intermediate layer and has a thickness of 0.2 to 1.0 µm and in which magnetic layer, a difference of an intensity at 102 mm$^{-1}$ and that at 205 mm$^{-1}$, in a frequency analysis of non-contact surface roughness, is from 9 dB to 15 dB, wherein a total thickness of the non-magnetic support, the intermediate layer and the magnetic layer is not larger than 13 µm. By a structure of the magnetic recording medium, the surface smoothness of the magnetic layer is sufficiently increased, and the electromagnetic conversion characteristics and durability of the magnetic recording medium are satisfactorily improved.

When the intermediate layer contains, as binder resins, a polyvinyl chloride resin and a polyurethane resin which have functional groups having the same polarity, the dispersibility of the non-magnetic particles and carbon black contained in the intermediate layer is improved, so that the surface smoothness of magnetic layer is further increased.

When iron powder containing 0.1 to 3.0% by weight of aluminum based on the weight of iron is used as the magnetic powder contained in the magnetic layer and a ratio of a Dx value (X-ray particle size) of the iron powder to the particle size of the non-magnetic particles in the intermediate layer is from 0.2 to 1.0 in terms of a ratio of the Dx value to a diameter or a short axis size of the non-magnetic particles in the intermediate layer, or when the magnetic layer contains alumina particles, and a ratio of a particle size of the alumina particles to the particle size of the nonmagnetic particles in the intermediate layer is from 3.0 to 12.0 in terms of a ratio of a diameter of alumina particles to the diameter or the short axis size of the non-magnetic particles in the intermediate layer, the durability of the magnetic recording medium is further increased.

BRIEF DESCRIPTION OF THE DRAWINGS

FIG. 2 shows a relationship between a ratio of the Dx value of the iron magnetic powder to the particle size of titanium oxide in the intermediate layer, and the durability and electromagnetic conversion characteristics of a video tape produced according to the present invention.

DETAILED DESCRIPTION OF THE INVENTION

Figure 1:
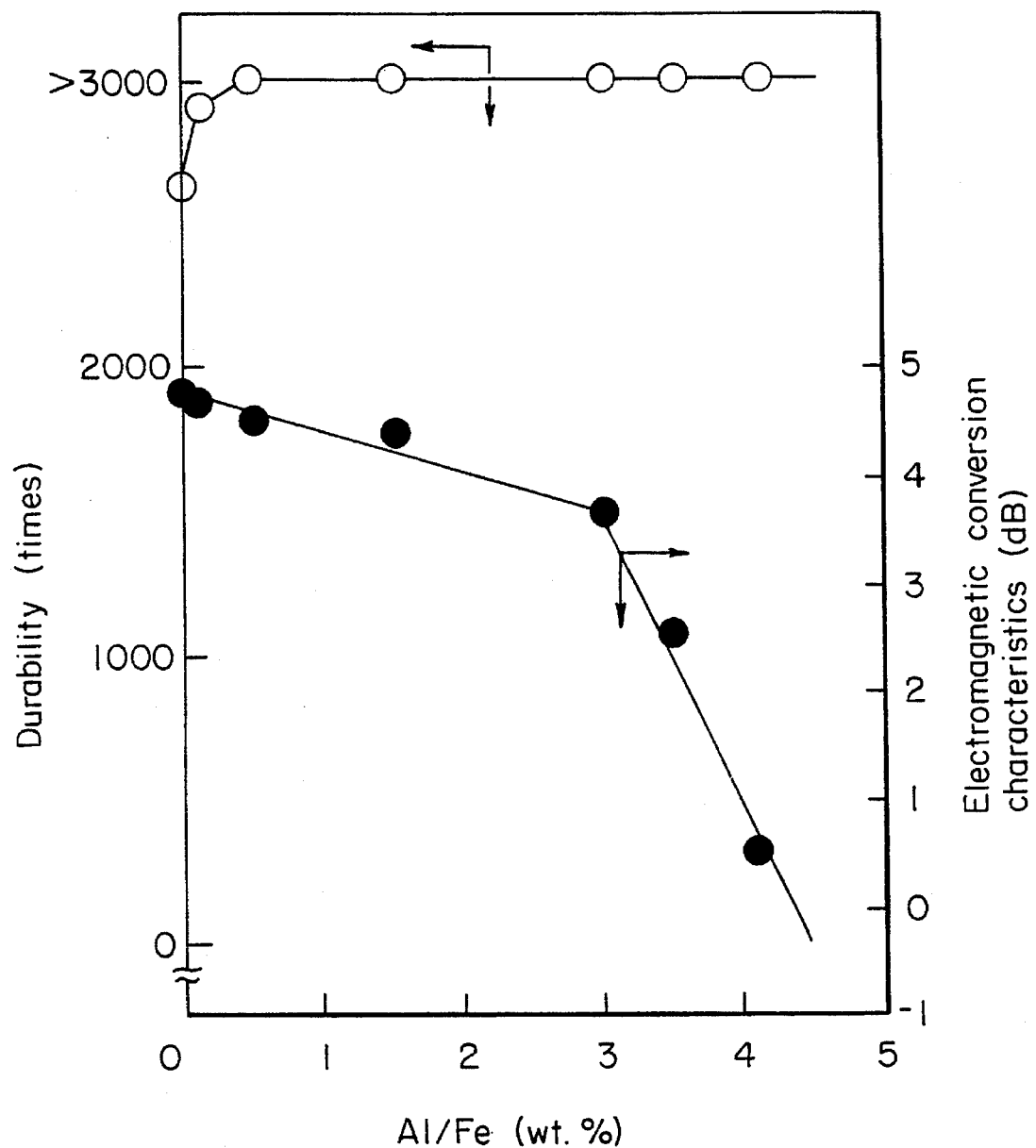
FIG. 1 shows a relationship between an aluminum content in the iron magnetic powder (Al/Fe) in the magnetic layer, and the durability and electromagnetic conversion characteristics of a video tape produced according to the present invention.

In the present invention, the intermediate layer, which is formed between the non-magnetic support and the magnetic layer, is formed using both the carbon black and the non-magnetic particles the particle size ratio between which is from 1.0 to 4.0 in terms of a ratio of a diameter or a short axis size of the non-magnetic particles to a particle size of carbon black. Thereby, the surface smoothness of the intermediate layer during drying is improved, and the resulting good surface conditions have an influence on the surface conditions of the magnetic layer which is formed on the intermediate layer, and the surface smoothness of the magnetic layer having a difference of an intensity at 102 $mm^{-1}$ and that at 205 $mm^{-1}$ in a frequency analysis of non-contact surface roughness of from 9 dB to 15 dB is sufficiently improved. Herein, the diameter and the short axis size are averaged values.

According to the present invention, the surface smoothness of the intermediate layer during drying is sufficiently improved, and the magnetic layer has a difference of an intensity at 102 $mm^{-1}$ and that at 205 $mm^{-1}$ in a frequency analysis of non-contact surface roughness of from 9 dB to 15 dB, whereby the magnetic recording medium has well improved electromagnetic conversion characteristics and durability.

When the particle size ratio of the non-magnetic particles to the carbon black which are used together is less than 1.0 or exceeds 4.0 in terms of a ratio of a diameter or a short axis size of the non-magnetic particles to a particle size of carbon black, the filling of these powders deteriorates and the surface smoothness of the intermediate layer is insufficient, so that the difference of an intensity at 102 $mm^{-1}$ and that at 205 $mm^{-1}$ in the frequency analysis of non-contact surface roughness on the magnetic layer formed on the intermediate layer is less than 9 dB or exceeds 15 dB. Consequently, a magnetic recording medium excellent in electromagnetic conversion characteristics and durability is not obtained.

When the difference between the intensities in the frequency analysis is less than 9 dB, while the number of unevenness the short period increases, a height difference of the unevenness decreases, so that a gap between the magnetic recording medium and a magnetic head is narrowed and the contact area between the magnetic recording medium and the magnetic tape increases, whereby the durability of the magnetic recording medium is negatively affected. When the difference between intensities in the frequency analysis exceeds 15 dB, while the number of unevenness of long period decreases, a height difference of the unevenness increases, so that the gap between the magnetic recording medium and the magnetic head increases, whereby the output is reduced.

A volume ratio of the non-magnetic particles to the carbon black is preferably from 70:30 to 60:40. When the amount of carbon black is too small or too large, the coating property of the paint deteriorates, so that some defects such as coating streaks appear on the magnetic layer surface, and a magnetic recording medium with good electromagnetic conversion characteristics or durability is not attainable.

As the binder resin to be used in the intermediate layer, a polyvinyl chloride resin and a polyurethane resin can be used. Preferably, a polyvinyl chloride resin and a polyurethane resin which have functional groups having the same polarity are used together. When the intermediate layer containing the non-magnetic particles, the carbon black and such binder resins is formed, the surface smoothness of the magnetic layer is satisfactorily improved.

When a polyvinyl chloride resin and a polyurethane resin which have functional groups having different polarity are used, those functional groups attract each other, so that the dispersion effects of the resins offset each other, and therefore, the surface smoothness is not satisfactorily improved.

A weight ratio of the total weight of the non-magnetic particles and carbon black to the binder resin is preferably from 80:20 to 60:40. When the amount of the powders is too large, shelf stability of the intermediate layer paint deteriorates, so that it is difficult to produce a uniform elongate magnetic recording medium. When it is too small, a degree of so-called curling of the magnetic tape increases, so that the running property of the magnetic recording medium during recording and reproducing is worsened and data errors are generated during recording and reproducing.

As the non-magnetic particles to be contained in the intermediate layer, those having any shape such as spheres, needles, cubes, etc. may be used. Preferably, the particles have a particle size of 20 to 100 nm. Specific examples of the non-magnetic particles are alumina, α-hematite, titanium oxide, chromium oxide, zinc oxide, barium sulfate, calcium carbonate, and the like. Examples of the commercially available products are NANOTITE (manufactured by Showa Denko Co., Ltd.); TF-100, TF-120, TF-140 and DPN-245 (manufactured by Toda Industries, Ltd.); TAIPAKE, TTO 55 and CR-50 (manufactured by Ishihara Industries, Ltd.); AKP-50, AOS-50 and HIT-50 (manufactured by Sumitomo Chemical Co., Ltd.); and the like.

As the carbon black, furnace black, thermal black, acetylene black and the like can be used. Preferably, the carbon black having a particle size of 10 to 50 nm is used. Neutral carbon black is preferred, and one having pH of 6 to 8.5 is preferably used. Examples of the commercially available carbon black are MONARCH 800, MONARCH 900, MONARCH 460, MONARCH 280, MONARCH 230, MONARCH 120, REGAL 330R, REGAL 415R, REGAL 250R and REGAL 99R (all manufactured by Cabot); LABEN 1250 (manufactured by Columbian Carbon); and the like.

As the binder resins contained in the intermediate layer, the polyvinyl chloride resin and the polyurethane resin having an anionic functional group such as —$SO_3M$ wherein M is H or an alkali metal, —$PO(OH)_2$, —$PO(OH)(ONR_1R_2R_3H)$ wherein $R_1$, $R_2$ and $R_3$ are each H, OH or an alkyl group, —$CO_2M$ wherein M is H or an alkali metal, and the like; or a cationic functional group such as —$NR_1R_2R_3^X$ wherein $R_1$, $R_2$ and $R_3$ are each an alkyl group and X is a halogen atom are used in combination, preferably. More preferably, the polyvinyl chloride resin and the polyurethane resin which have the functional groups having the same polarity are used together.

Examples of the polyvinyl chloride resin are MR110, MR113 and MR116 (manufactured by Nippon Zeon Co., Ltd.); ESLEK E C130 and ESLEK E C110 (manufactured by Sekisui Chemical Industries, Ltd.); MPR-TAO (manufactured by Nisshin Chemical Industries, Ltd.); VMCH, MXR-527, MXR-536 and MXR-535 (manufactured by UCC); and the like.

Examples of the polyurethane resin are UR 8300, UR 8700 and UR 8200 (manufactured by Toyobo Co., Ltd.), and the like.

In addition to the polyvinyl chloride resin and the polyurethane resin, a polyisocyanate compound may be used in combination therewith. Further, other binder resins which are used in magnetic recording media may be used.

To the intermediate layer, a lubricant may be added. In particular, an aliphatic acid ester base lubricant, such as n-butyl stearate, is preferred since it improves the wettability with the magnetic layer which is formed on the intermediate layer. Further, an aliphatic acid, such as stearic acid, myristic acid, palmitic acid, etc. may be added.

In the above case, an amount of the aliphatic acid ester base lubricant is preferably from 0.5 to 5.0% by weight based on the total weight of the non-magnetic particles and the carbon black, since when the amount is less than 0.5% by weight, the intended effects are not achieved, while when the amount exceeds 5.0% by weight, the durability of the intermediate layer is negatively affected.

An amount of the aliphatic acid is preferably not larger than 4.0% by weight based on the total weight of the non-magnetic particles and the carbon black, since this amount exceeds 4.0% by weight, the durability of the magnetic layer is deteriorated.

The amount of the lubricant is not determined only from the view point of durability of the intermediate layer. Also taken into consideration is the durability of the magnetic recording medium. From such view point, when the amount of the lubricant is limited from an extracted amount described in Japanese Patent KOKAI Publication No. 128495/1993, an extracted amount is preferably in the range between 20 and 50 mg/m$^2$ in the case of the aliphatic acid ester, or 10 mg/m$^2$ or less in the case of the aliphatic acid, when the magnetic recording medium is extracted with n-hexane as a solvent at room temperature for 16 hours.

Such intermediate layer is formed by mixing and dispersing the non-magnetic particles and the carbon black in the polyvinyl chloride resin and the polyurethane resin which have the functional groups having the same polarity and an organic solvent to prepare an intermediate layer paint, coating the prepared intermediate layer paint on the non-magnetic support, and drying it.

As the organic solvent used in the preparation of the intermediate layer paint, any of the conventional solvents which are used in the production of the magnetic recording medium may be used. For example, ketones such as methyl ethyl ketone, cyclohexanone, methyl isobutyl ketone, etc.; ethers such as tetrahydrofuran, dioxane, etc.; acetates such as ethyl acetate, butyl acetate, etc., or mixtures thereof can be used. They may be used in combination with toluene and the like.

The magnetic layer on the intermediate layer is formed by mixing and dispersing a conventional magnetic powder such as Fe powder, Co powder, Fe—Ni powder, barium ferrite, strontium ferrite and the like in the binder resin and the organic solvent to prepare the magnetic paint, coating the magnetic paint on the intermediate layer which has been formed on the non-magnetic support and drying it.

When the binder resins having functional groups having different polarities are used between the intermediate layer and the magnetic layer, for example, a resin having a cationic functional group used as the binder resin in the intermediate layer and a resin having an anionic functional group used as the binder resin in the magnetic layer, the adhesion between the intermediate layer and the magnetic layer is increased due to a slight attracting force between the different polarities, so that the durability is improved. Therefore, the above combination of the binder resins is preferred.

As the magnetic powder, one containing alumina is preferred to improve the durability sufficiently. In the case of Fe powder containing alumina, alumina is contained in an amount of 0.1 to 3.0% by weight in terms of aluminum based on the weight of iron, since when this amount is less than 0.1% by weight, the durability is not improved, while when it is larger than 3.0% by weight, the electromagnetic conversion characteristics are deteriorate. In particular, the magnetic powder containing 0.5 to 2.0% by weight of aluminum based on the Fe weight is preferably used.

Preferably, the particle size of the magnetic powder containing alumina has the ratio of a Dx value (X-ray particle size) of the iron powder to the particle size of the non-magnetic particles in the intermediate layer in the range between 0.2 and 1.0, more preferably between 0.4 and 1.0, in terms of a ratio of the Dx value to a diameter or a short axis size of the non-magnetic particles in the intermediate layer, since when this ratio is less than 0.2, the durability cannot be improved sufficiently, while when it is larger than 1.0, it is difficult to maintain the reproducing output.

As an abrasive to be contained in the magnetic layer, alumina is preferably used, since it improves the durability sufficiently. In such case, a ratio of the particle size of the alumina particles to the particle size of the non-magnetic particles in the intermediate layer is from 3.0 to 12.0, more preferably from 3.3 to 10, in terms of a ratio of a diameter of alumina particles to the diameter or the short axis size of the non-magnetic particles in the intermediate layer, since when this ratio is less than 3.0, the durability cannot be improved sufficiently, while when it is larger than 12.0, the magnetic head is flawed.

An amount of alumina to be contained in the magnetic layer is preferably from 6.5 to 15.0%. by weight in terms of an amount of aluminum based on the weight of iron. When the amount of aluminum based on the iron is less than 6.5% by weight, the durability is not improved sufficiently, while when it is larger than 15.0% by weight, a content of non-magnetic components becomes too large so that the reproducing output decreases.

Alumina may be added to the magnetic layer or contained in the magnetic powder as described above. In either case, the abrading function is facilitated by the presence of alumina so that the durability is increased.

The magnetic recording medium of the present invention is produced by laminating the intermediate layer and the magnetic layer on the non-magnetic support. To achieve the sufficient recording capacity and also increase the electromagnetic conversion characteristics and the durability of the magnetic recording medium, preferably, a total thickness of the non-magnetic support, the intermediate layer and the magnetic layer is not larger than 13 μm, a squareness ratio of the magnetic layer is at least 0.7, and a residual magnetic flux density is at least 3000 Gauss.

The magnetic layer having the squareness ratio of at least 0.78 and the residual magnetic flux density of at least 3000 Gauss can be formed by coating the magnetic paint after coating the intermediate layer paint and before drying it and subjecting the magnetic paint to a magnetic field orientation treatment during the drying step of the magnetic paint. As the orientation of the magnetic powder particles is improved by the magnetic field orientation treatment, the magnetic layer becomes dense, so that the durability is increased. When the squareness ratio is 0.78 or larger and the residual magnetic flux density is 3000 Gauss or larger, the orientation of the magnetic powder particles is sufficiently good and the magnetic layer is dense, so that the durability is further increased.

As a packing density of the magnetic powder increases, the magnetic layer becomes more dense and the durability becomes better. Therefore, it is preferable to increase the packing property of the magnetic powder in addition to its orientation. The packing property of the magnetic powder can be adjusted by subjecting the magnetic layer to a surface smoothing treatment by calendering after the formation of the magnetic layer. Conditions of the surface smoothing treatment depend on the composition of the magnetic layer. For example, the treatment may be carried out by running the magnetic recording medium between metal rolls which are heated to 80° C. while applying a linear pressure of 150 kg/cm on the medium.

In addition, in the case where the intermediate layer and the magnetic layer are formed on the non-magnetic support according to the present invention, the sufficient durability is achieved when the total thickness of the non-magnetic support, the intermediate layer and the magnetic layer is in the range between 7.5 and 20.0 µm. When the total thickness of the non-magnetic support, the intermediate layer and the magnetic layer is less than 13 µm, the sufficient durability is achieved as well as the sufficient recording capacity is obtained.

Accordingly, when the total thickness of the non-magnetic support, the intermediate layer and the magnetic layer is less than 13 µm, the squareness ratio of the magnetic layer is at least 0.78 and the residual magnetic flux density is at least 3000 Gauss, the electromagnetic conversion characteristics and the durability are sufficiently improved as well as the sufficient recording capacity is obtained.

The intermediate layer paint and the magnetic layer paint can be coated by a per se conventional method such as a method disclosed in Japanese Patent Publication No. 59491/1994. For example, to coat the intermediate layer paint, roll coating, gravure coating, extrusion die coating, curtain coating and the like can be used. To coat the magnetic paint, extrusion die coating can be used.

PREFERRED EMBODIMENTS

EXAMPLES.

The examples of the present invention will be explained.

Example 1

| | Parts by weight |
|---|---|
| Titanium oxide (TTO 55 manufactured by Ishihara Industries, particle size of 35 nm) | 60 |
| Carbon black (MONARCH 800 manufactured by Cabot, particle size of 17 nm) | 15 |
| MR 110 ($SO_3K$-containing polyvinyl chloride resin manufactured by Nippon Zeon) | 12.5 |
| UR 8300 ($SO_3Na$-containing polyurethane resin manufactured by Toyobo) | 7.5 |
| n-Butyl stearate | 1.5 |
| Cyclohexanone | 110 |
| Toluene | 110 |

The above components were mixed and dispersed in a sand grinding mill. To the mixture, 5 parts by weight of a polyisocyanate compound (COLONATE L manufactured by Nippon Polyurethane Industries) was added and mixed, followed by filtration through a filter having an average pore size of 0.5 µm to obtain an intermediate layer paint.

Separately, a composition of:

| | Parts by weight |
|---|---|
| Fe-magnetic powder (Dx 15 nm, Al/Fe = 0.5 wt. %) | 80 |
| MR 110 ($SO_3K$-containing polyvinyl chloride) resin manufactured by Nippon Zeon) | 8 |
| OR 8300 ($SO_3Na$-containing polyurethane resin manufactured by Toyobo) | 8 |
| Alumina (particle size of 200 nm) | 8 |
| Carbon black | 4 |
| n-Butyl stearate | 1.2 |
| Myristic acid | 1.2 |
| Cyclohexanone | 72.5 |
| Methyl ethyl ketone | 72.5 |
| Toluene | 72.5 | was mixed and dispersed in a sand grinding mill. To the mixture, 4 parts by weight of a polyisocyanate compound (COLONATE L manufactured by Nippon Polyurethane Industries) was added and mixed, followed by filtration through a filter having an average pore size of 0.5 µm to obtain a magnetic paint.

The prepared intermediate layer paint was coated on a polyester film having a thickness of 8 µm with a gravure coater to a thickness of 2.0 µm after drying. While the intermediate layer paint was still in the wet state, the prepared magnetic paint was coated with a die coater to a thickness of 0.5 µm after drying, subjected to the magnetic field orientation treatment and dried.

Then, the magnetic layer was subjected to the surface smoothing treatment and kept at 60° C. for 24 hours. Thereafter, on a reverse surface of the film, a back coating layer was formed, and the film was cut to a width of 8 mm to obtain a 8 mm video tape.

A particle size ratio of the titanium oxide particles to the carbon black in the intermediate layer of the produced video tape was 2.06. A particle size ratio of the alumina particles in the magnetic layer to the titanium oxide particles in the intermediate layer was 5.71.

Example 2

In the same manner as in Example 1 except that α-hematite (NANOTITE 60 manufactured by Showa Denko, particle size of 60 nm) was used in the same amount in place of titanium oxide in the composition of the intermediate layer paint, a 8 mm video tape was produced.

A particle size ratio of the α-hematite particles to the carbon black in the intermediate layer of the produced video tape was 3.53. A particle size ratio of the alumina particles in the magnetic layer to the α-hematite particles in the intermediate layer was 3.33.

Example 3

In the same manner as in Example 1 except that α-hematite (DPN-245 manufactured by Toda Industries, particle size of 185 nm×31 nm) was used in the same amount in place of titanium oxide in the composition of the intermediate layer paint, a 8 mm video tape was produced.

A particle size ratio of the α-hematite particles to the carbon black in the intermediate layer of the produced video tape was 1.82. A particle size ratio of the alumina particles in the magnetic layer to the α-hematite particles in the intermediate layer was 6.45.

Example 4

In the same manner as in Example 1 except that REGAL 250 (manufactured by Cabot, particle size of 35 nm) was used in the same amount in place of MONARCH 800 as the carbon black in the composition of the intermediate layer paint, a 8 mm video tape was produced.

A particle size ratio of the titanium oxide particles to the carbon black in the intermediate layer of the produced video tape was 1.00. A particle size ratio of the alumina particles in the magnetic layer to the titanium oxide particles in the intermediate layer was 5.71.

Example 5

In the same manner as in Example 2 except that REGAL 250 (manufactured by Cabot, particle size of 35 nm) was used in the same amount in place of MONARCH 800 as the carbon black in the composition of the intermediate layer paint, a 8 mm video tape was produced.

A particle size ratio of the α-hematite particles to the carbon black in the intermediate layer of the produced video tape was 1.71. A particle size ratio of the alumina particles in the magnetic layer to the short axis of α-hematite particles in the intermediate layer was 3.33.

Example 6

In the same manner as in Example 1 except that the thickness of the magnetic layer was changed from 0.5 μm to 0.2 μm, a 8 mm video tape was produced.

Example 7

In the same manner as in Example 1 except that the thickness of the magnetic layer was changed from 0.5 μm to 1.0 μm, a 8 mm video tape was produced.

Example 8

In the same manner as in Example 1 except that ESLEK E C130 (N(CH$_3$)$_3$Cl-containing polyvinyl chloride resin manufactured by Sekisui Chemical Industries) was used in the same amount in place of MR 110 and a N(CH$_3$)$_3$Cl-containing polyurethane resin (backbone: butylene-adipate/ 4,4-diphenylmethane diisocyanate, the molecular weight of 23,000, the content of functional group of 0.2 meq/g) in the composition of the intermediate layer paint, a 8 mm video tape was produced.

Example 9

In the same manner as in Example 1 except that the same amount of Fe magnetic powder having a Dx value of 15 nm and containing alumina in a varying content was used in the composition of the magnetic paint, a 8 mm video tape was produced.

Example 10

In the same manner as in Example 1 except that the same amount of Fe magnetic powder having a different Dx value and the content of alumina was same in the composition of the magnetic paint, a 8 mm video tape was produced.

FIG. 1 shows a relationship between an aluminum content (Al/Fe) in the iron magnetic powder in the magnetic layer and the durability and electromagnetic conversion characteristics of the video tape produced in Example 9, and FIG. 2 shows a relationship between a ratio of the Dx value of the iron magnetic powder to the particle size of titanium oxide in the intermediate layer and the durability and electromagnetic conversion characteristics of the video tape produced in Example 10.

Example 11

In the same manner as in Example 1 except that alumina having a particle size of 400 nm in the same amount was used in place of alumina having a particle size of 200 nm in the magnetic paint, a 8 mm video tape was produced.

A particle size ratio of the alumina particles in the magnetic layer to the titanium oxide particles in the intermediate layer of the produced video tape was 11.4.

Example 12

In the same manner as in Example 1 except that alumina having a particle size of 170 nm in the same amount was used in place of alumina having a particle size of 200 nm in the magnetic paint, a 8 mm video tape was produced.

A particle size ratio of the alumina particles in the magnetic layer to the titanium oxide particles in the intermediate layer of the produced video tape was 4.86.

Comparative Example 1

In the same manner as in Example 1 except that α-hematite (TF-100 manufactured by Toda Industries, particle size of 100 nm) was used in the same amount in place of titanium oxide in the composition of the intermediate layer paint, a 8 mm video tape was produced.

A particle size ratio of the α-hematite particles to the carbon black in the intermediate layer of the produced video tape was 5.88. A particle size ratio of the alumina particles in the magnetic layer to the α-hematite particles in the intermediate layer was 2.00.

Comparative Example 2

In the same manner as in Comparative Example 1 except that alumina having a particle size of 170 nm in the same amount was used in place of alumina having a particle size of 200 nm and CEBACALB MT-Cl (manufactured by Columbian Chemistry, particle size of 370 nm) in the same amount was used in place of MONARCH 800 in the magnetic paint, a 8 mm video tape was produced.

A particle size ratio of the α-hematite particles to the carbon black in the intermediate layer of the produced video tape was 0.27. A particle size ratio of the alumina particles in the magnetic layer to the α-hematite particles in the intermediate layer was 0.59.

Comparative Example 3

In the same manner as in Example 2 except that alumina having a particle size of 1500 nm in the same amount was used in place of alumina having a particle size of 200 nm in the magnetic paint, a 8 mm video tape was produced.

A particle size ratio of the α-hematite particles to the carbon black in the intermediate layer of the produced video tape was 3.53. A particle size ratio of the alumina particles in the magnetic layer to the α-hematite particles in the intermediate layer was 25.0.

In the same manner as in Example 1 except that the thickness of the magnetic layer was changed from 0.5 μm to 0.18 μm, a 8 mm video tape was produced.

Comparative Example 5

In the same manner as in Example 1 except that the thickness of the magnetic layer was changed from 0.5 μm to 1.1 μm, a 8 mm video tape was produced.

Comparative Example 6

In the same manner as in Example 1 except that ESLEK E C130 (N(CH$_3$)$_3$Cl-containing polyvinyl chloride resin manufactured by Sekisui Chemical Industries) was used in the same amount in place of MR 110 in the composition of the intermediate layer paint, a 8 mm video tape was produced.

With each of the video tapes produced in Examples and Comparative Examples, the surface roughness was measured by the frequency analysis using the non-contact type surface roughness meter, and the electromagnetic conversion characteristics and durability were measured as follows:

Electromagnetic conversion characteristics

Using a 8 mm VCR manufactured by SONY, 100% white signal is recorded, and the output is measured on an oscilloscope when the signal is reproduced.

Durability

Using a reciprocal sliding type tester with a bearing steel ball having a diameter of 6.35 as a slider, a surface of the 8 mm video tape is rubbed by the steel ball at a sliding speed of 30 mm/sec. under a load of 20 g, and the number of reciprocal sliding times till a coefficient of friction suddenly increases.

The results are shown in the following Table.

Frequency analysis with non-contact type surface roughness meter

An object head PX-4 is attached to a non-contact type surface roughness meter TOPO-3D (manufactured by WYCO), and a surface roughness of each video tape is measured. Using the same apparatus, a frequency analysis is carried out under the following conditions Hanning Window: OFF Sample Interval: 3

Reference Level: 1.000 nm

Maximum Y Value: Automatic

Integration Limit: 0.00/mm to 1000.00/mm

Integration Area: Absolute FFT.

Then, a difference between an intensity at the frequency of 102 $mm^{-1}$ and that at the frequency of 205 $mm^{-1}$ is calculated.

TABLE

| Example No. | Measured value in frequency analysis (dB) | Electromagnetic-characteristics (dB) | Durability (times) |
| --- | --- | --- | --- |
| 1 | 10 | +4.5 | >2000 |
| 2 | 12 | +3.0 | >2000 |
| 3 | 13 | +3.5 | >2000 |
| 4 | 9 | +4.5 | >2000 |
| 5 | 10 | +4.5 | >2000 |
| 6 | 10 | +4.5 | >2000 |
| 7 | 10 | +4.5 | >2000 |
| 8 | 10 | +5.5 | >2000 |
| 9 | 10 | See FIG. 1 | |
| 10 | 10 | See FIG. 2 | |
| 11 | 15 | +3.0 | >2000 |
| 12 | 9 | +4.5 | >2000 |
| C. 1 | 20 | 0 | 1000 |
| C. 2 | 18 | 0 | 500 |
| C. 3 | 12 | −1.0 | 500 |
| C. 4 | 7 | +5.0 | 500 |
| C. 5 | 18 | 0 | >2000 |
| C. 6 | 20 | −1.0 | 50 |

As seen from the above Table, the 8 mm video tapes produced according to the present invention (Examples 1 through 12) had better electromagnetic conversion characteristics and durability than those produced in Comparative Examples 1 through 6. As seen from FIGS. 1 and 2, the 8 mm video tapes produced according to the present invention had good electromagnetic conversion characteristics and durability. From these results, it is understood that the magnetic recording medium of the present invention has improved electromagnetic conversion characteristics and durability.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic digital recording medium comprising:

a non-magnetic support;

an intermediate layer on said non-magnetic support, said intermediate layer comprising carbon black and non-magnetic particles other than carbon black, a particle size ratio between said non-magnetic particles and said carbon black being from 1.0 to 4.0 in terms of a ratio of a diameter or a short axis size of said non-magnetic particles to a particle size of said carbon black; and a magnetic layer on said intermediate layer, said magnetic layer having a thickness of from 0.2 to 1.0 µm, wherein said magnetic layer has a difference of an intensity between 102 $mm^{-1}$ and 205 $mm^{-1}$ in a frequency analysis of non-contact surface roughness in a range of from 9 dB to 15 dB, wherein said magnetic layer comprises a magnetic powder comprising iron powder containing 0.1 to 3.0% by weight of aluminum based on the weight of iron content, and a ratio of a Dx value (X-ray particle size) of said iron powder to the particle size of said non-magnetic particles in said intermediate layer is from 0.2 to 1.0 in terms of a ratio of the Dx value to a diameter or a short axis size of said non-magnetic particles in said intermediate layer, and wherein said non-magnetic support, said intermediate layer and said magnetic layer have a total thickness of no greater than 13 µm, said magnetic recording medium being suitable for digital recording.

2. The magnetic recording medium according to claim 1, wherein said intermediate layer further comprises binder resins including a polyvinyl chloride resin having a functional group and a polyurethane resin having a functional group, said functional groups being both cationic or both anionic functional groups.

3. The magnetic recording medium according to claim 1, wherein said magnetic layer contains alumina particles, and a ratio of a particle size of said alumina particles to the particle size of said non-magnetic particles in said intermediate layer is from 3.0 to 12.0 in terms of a ratio of a diameter of alumina particles to a diameter or a short axis size of said non-magnetic particles in said intermediate layer.

4. The magnetic recording medium according to claim 1, wherein the non-magnetic particles have a particle size of 20 to 100 nm, and wherein the particle size of said carbon black is 10 to 50 nm.

5. The magnetic recording medium according to claim 4, wherein the weight ratio of the total weight of the non-magnetic particles and the carbon black with respect to the binder resin is 80:20 to 60:40.

* * * * *